United States Patent
Ashida

(10) Patent No.: US 8,670,629 B2
(45) Date of Patent: Mar. 11, 2014

(54) IMAGE PROCESSING APPARATUS, IMAGE PROCESSING METHOD, AND PROGRAM FOR CONVERTING AN M-VALUE INTO AN N-VALUE IMAGE

(75) Inventor: Jumpei Ashida, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/216,916

(22) Filed: Aug. 24, 2011

(65) Prior Publication Data

US 2012/0051659 A1 Mar. 1, 2012

(30) Foreign Application Priority Data

Aug. 30, 2010 (JP) ................................ 2010-192727

(51) Int. Cl.
*G06K 9/36* (2006.01)
*G06K 9/46* (2006.01)

(52) U.S. Cl.
USPC .......................................... 382/252; 382/251

(58) Field of Classification Search
USPC ......... 382/164, 167, 173, 232, 233, 250–252, 382/270; 375/240.14, 240.25, 240.27, 244, 375/292; 348/174, 254
See application file for complete search history.

(56) References Cited

U.S. PATENT DOCUMENTS

| | | | |
|---|---|---|---|
| 5,521,989 A * | 5/1996 | Fan | 382/270 |
| 7,038,721 B2 * | 5/2006 | Stessen et al. | 348/254 |
| 7,075,993 B2 * | 7/2006 | O'Brien, Jr. | 375/240.27 |
| 7,308,151 B2 * | 12/2007 | Munsil et al. | 382/252 |
| 2012/0051659 A1 * | 3/2012 | Ashida | 382/252 |

FOREIGN PATENT DOCUMENTS

| | | |
|---|---|---|
| JP | 6-301364 A | 10/1994 |
| JP | 11-17945 A | 1/1999 |
| JP | 4039395 B2 | 1/2008 |

OTHER PUBLICATIONS

R.Floyd, L.Steinberg, "An Adaptive Algorithm for Spatial Greyscale", Proceeding of the S.I.D., vol. 17/2, 1976, p. 75-77.

* cited by examiner

*Primary Examiner* — Amir Alavi

(74) *Attorney, Agent, or Firm* — Canon USA, Inc. IP Division

(57) ABSTRACT

An apparatus capable of dividing an m-value image into a plurality of divided images and performing quantization into an n-value image (2≤n<m) for each divided image includes a first quantization unit for quantizing a first region in the divided image similarly to a region to be joined, and a second quantization unit for sequentially quantizing a second region in the divided image including the first region. If the second quantization unit quantizes the first region, parameters for the quantization processing is corrected using a quantization result in the first quantization unit such that the quantization result approaches the quantization result in the first quantization unit.

23 Claims, 12 Drawing Sheets

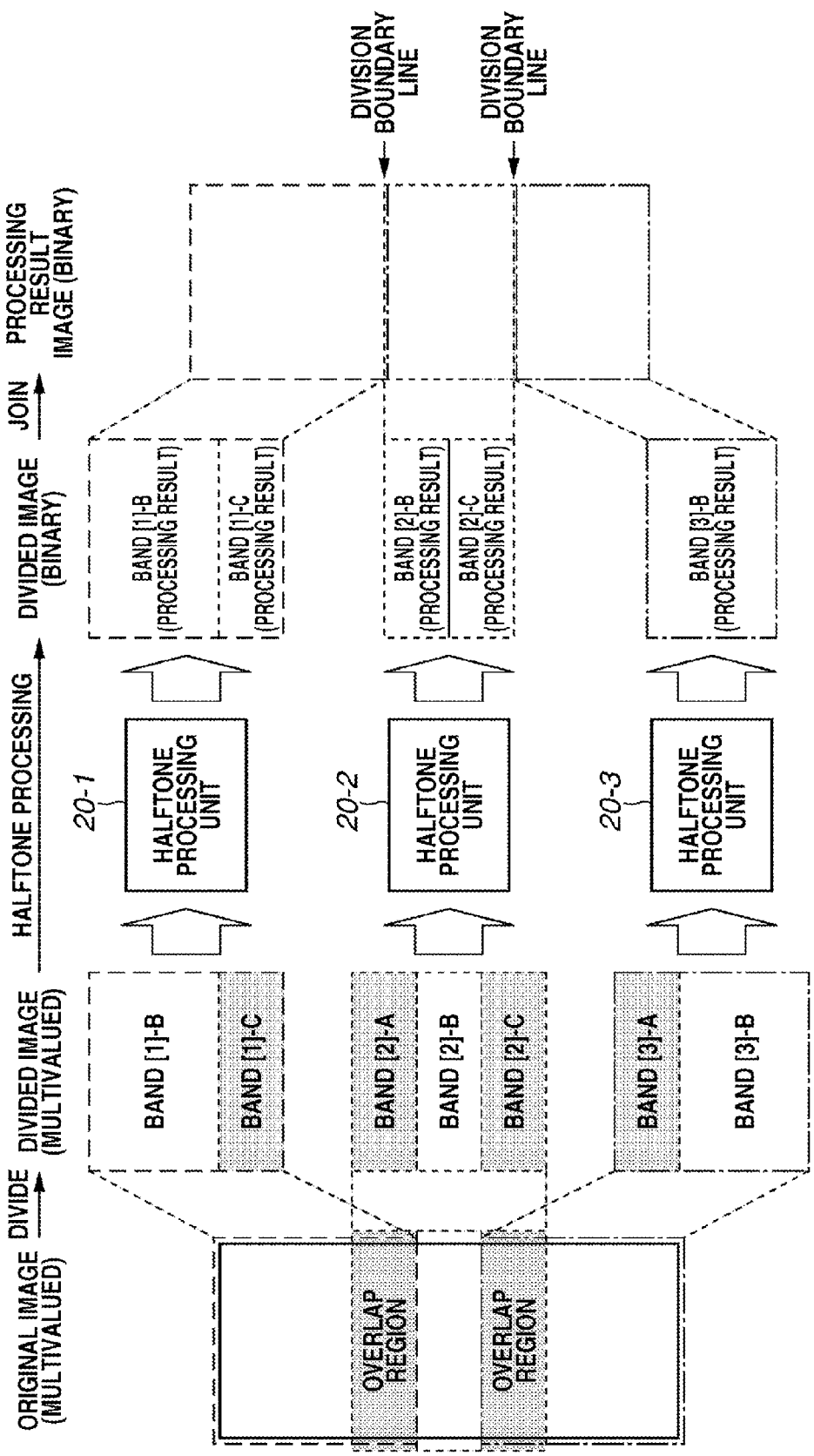

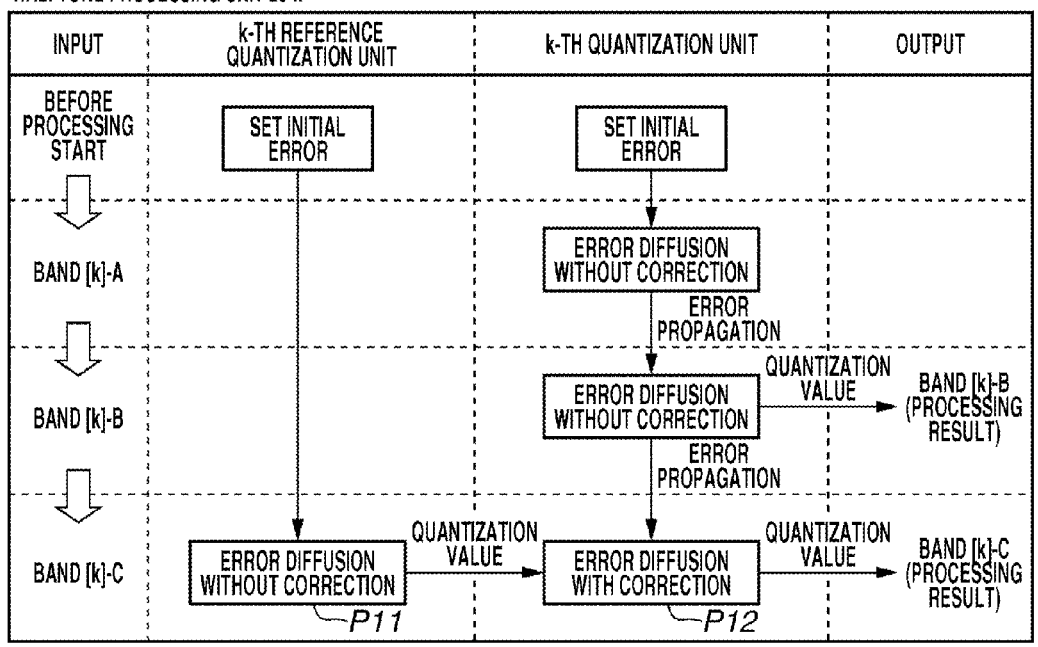
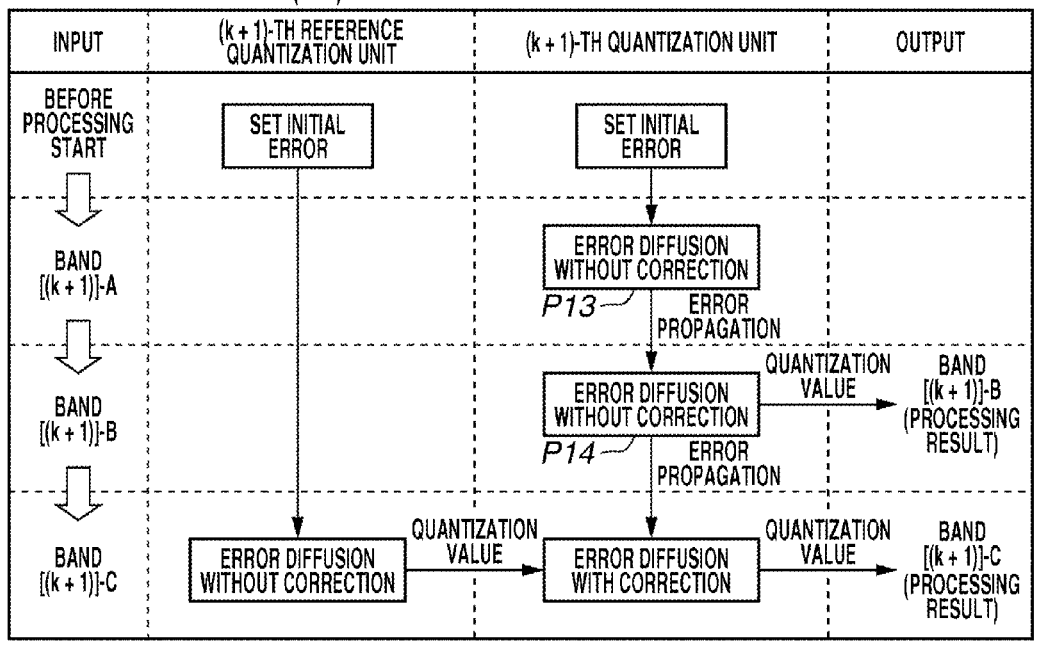

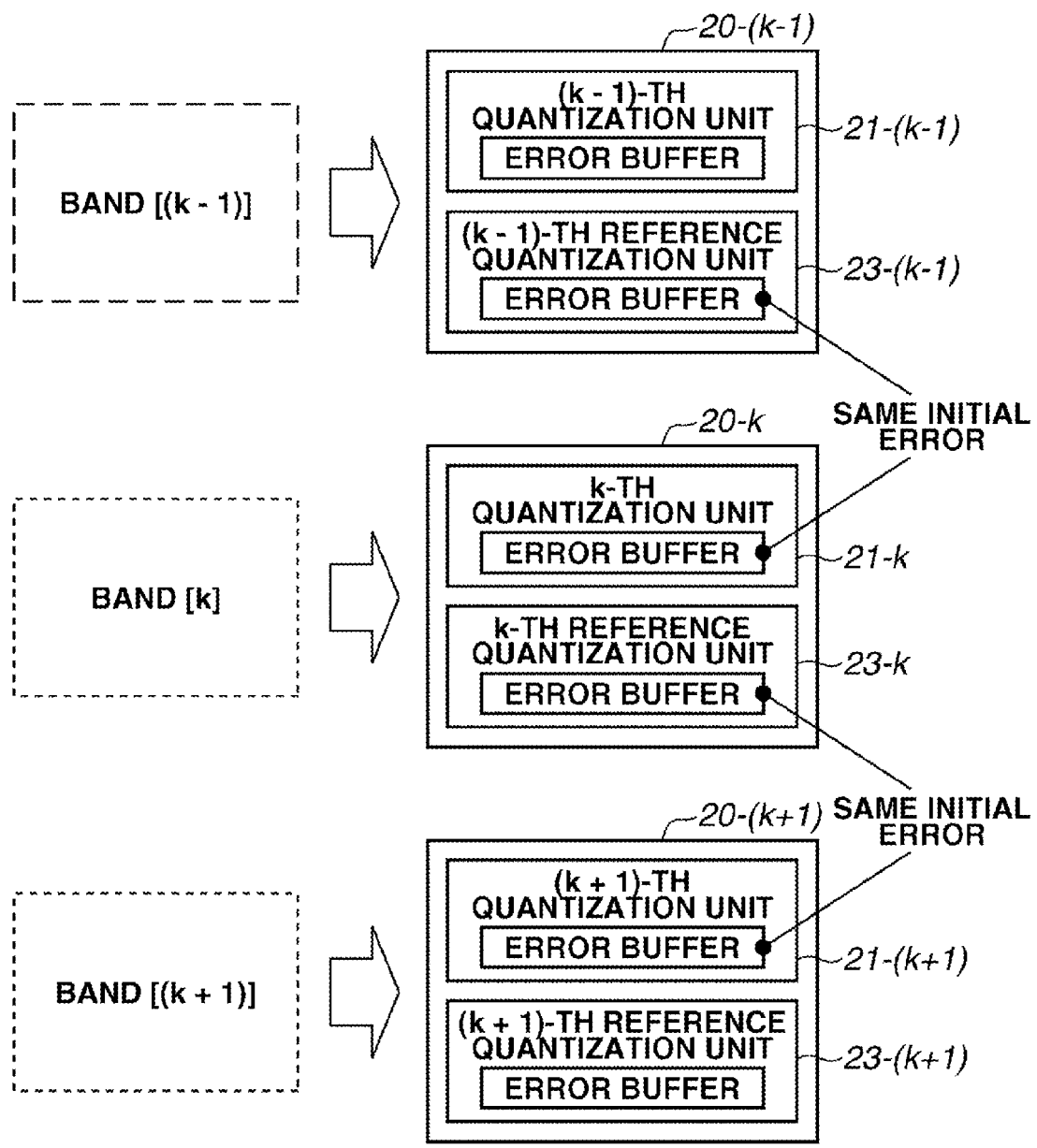

FIG.6

| 1/16 | 5/16 | 3/16 |
|------|------|------|
| 7/16 | *    |      |

PE1

IMAGE PROCESSING APPARATUS, IMAGE PROCESSING METHOD, AND PROGRAM FOR CONVERTING AN M-VALUE INTO AN N-VALUE IMAGE

BACKGROUND OF THE INVENTION

1. Field of the Invention

The present invention relates to an image processing apparatus, an image processing method, and a program. More particularly, the present invention relates to an image processing technique for converting an m-value image into an n-value image.

2. Description of the Related Art

Conventionally, image processing apparatuses for converting input continuous tone image data into binary image data and outputting the data have used, for example, an error diffusion method as a method for converting the continuous tone image into the binary image. The error diffusion method is a method for diffusing a difference (quantization error) between a gradation value of a target pixel and a binarized quantization representative value into gradation values of neighbor pixels of the target pixel, and sequentially binarizing each gradation value (see, R. Floyd, L. Steinberg, "An Adaptive Algorithm for Spatial Gray scale", Proceeding of the S.I.D., vol 17/2, 1976, p. 75-76).

In the image processing for converting a continuous tone image into a binary image, as the increase in resolutions of images in recent years, the data amounts have also increased. Thus, an increase in memory sizes and an increase in processing time have become an issue. To cope with the issue, a continuous tone image to be processed is divided into a plurality of regions in advance so as to reduce the size of the memory and to increase a processing speed by parallel processing. In such a method, the images are binarized by sequential processing or parallel processing for each divided region, and after the processing, the divided images in each region are joined.

However, in a case where the each divided image is processed in parallel by the error diffusion method, an error cannot be correctly propagated to the divided images of the adjacent regions beyond the boundary between the regions. Accordingly, when each divided image is joined, discontinuity of dot patterns (texture) appears in the joint part. The discontinuity dots can be easily noticed like a streak, and the image quality is largely impaired. Such a streak may appear when two or more different binarization methods are applied to one image. For example, if one image is divided into two regions, one of the regions is quantized using the error diffusion method, and the other region is quantized using a dither method, a dot pattern appears discontinuously at the boundary of the regions, and thus the discontinuity of the dot pattern can be easily noticed as a streak.

Against such a background, Japanese Patent Application Laid-Open No. 6-301364 discusses a method for dividing an input image to be processed into a plurality of regions, and performing the error diffusion processing to each region with contrivance in the error diffusion to pixels adjacent to a boundary line. With the technique, an attempt of reducing the appearance of the streak in the join part in the image has been made. Further, Japanese Patent Application Laid-Open No. 11-17945 discusses an attempt to prevent the decrease in the image quality in the join part of the image by processing further adjacent regions by delaying at least one line or more, and diffusing an error of pixels adjacent to the boundary line into pixels in a neighbor region on which the processing has not been performed yet. In Japanese Patent No. 4039395, before an image to be processed is divided, error diffusion processing is performed on each pixel on a division line, and an error is diffused into two regions across the division line. Then, the error diffusion processing is performed on each divided region.

In the methods discussed in Japanese Patent Application Laid-Open No. 6-301364 and Japanese Patent Application Laid-Open No. 11-17945, since the error propagation between the regions in the border part is approximate propagation, the visibility of the streak in the join part of the image can be reduced, however, the streak cannot be completely removed. Further, in the method discussed in Japanese Patent No. 4039395, a diffusion direction and a diffusion coefficient different from the other regions are used on the division line. Therefore, the dot pattern in the boundary part is different from those in the other regions, and this can be seen as a streak.

SUMMARY OF THE INVENTION

According to an aspect of the present invention, an apparatus includes an image processing unit configured to quantize the m-value image divided into a plurality of divided images for each of the divided images. The image processing unit includes a first quantization unit configured to perform n-value conversion on a pixel value in a first region in the divided image (m and n are integers, and $2 \leq n < m$), and with respect to a second region in the divided image including the first region, a second quantization unit configured to perform the n-value conversion on a pixel value in a part in the second region except for the first region, and perform the n-value conversion on a pixel value in the first region using an error propagated by the n-value conversion of the part, wherein, if the n-value conversion is performed on a pixel value in the first region, the second quantization unit corrects parameters for quantization processing using a first quantization result in the first quantization unit or intermediate data so that a second quantization result in the second quantization unit approaches the first quantization result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of image division according to the first exemplary embodiment.

FIGS. 3A and 3B illustrate examples of operations of the image processing apparatus according to the first exemplary embodiment.

FIG. 4 illustrates initial errors according to the first exemplary embodiment of the present invention.

FIG. 6 illustrates an example of diffusion coefficients.

DESCRIPTION OF THE EMBODIMENTS

Various exemplary embodiments, features, and aspects of the invention will be described in detail below with reference to the drawings.

Figure 1:
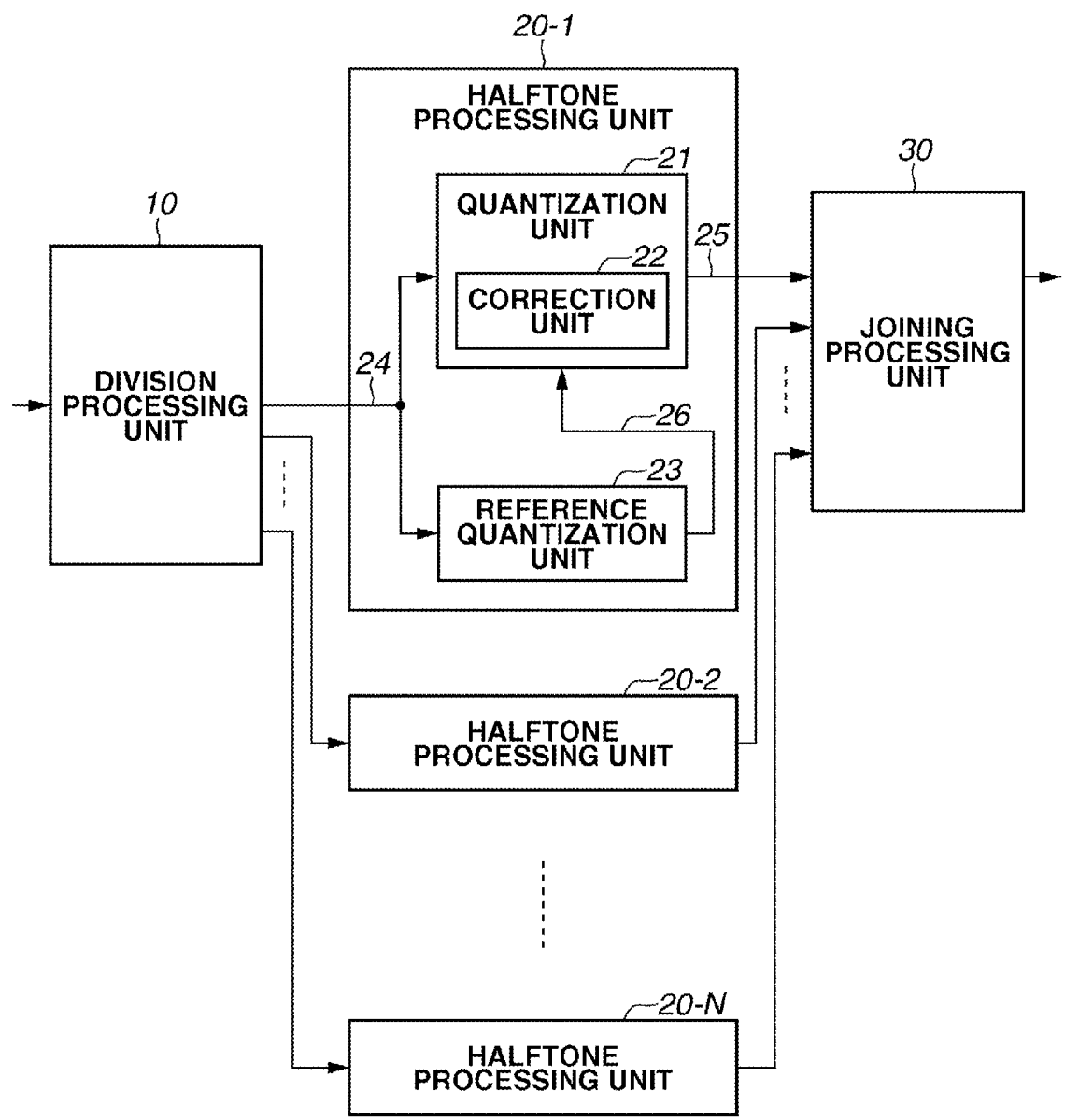
FIG. 1 illustrates an example of a configuration of an image processing apparatus according to a first exemplary embodiment of the present invention.

A first exemplary embodiment to which the present invention can be applied is described. FIG. 1 illustrates an example of a configuration of an image processing apparatus according to the first exemplary embodiment.

In FIG. 1, the image processing apparatus includes a division processing unit 10, halftone processing units 20-$k$ ($k$=1, 2, ..., N), and a joining processing unit 30. To the division processing unit 10, an m-value image (original image) to be processed is input, and the division processing unit 10 divides the input m-value image into a plurality of regions. The halftone processing unit 20-$k$ performs halftone processing to each of the regions of the m-value image divided by the division processing unit 10. More specifically, the halftone processing unit 20-$k$ performs n-value conversion to each of the divided images of the divided m-value image, and converts each data into an n-value image respectively.

The joining processing unit 30 joins the n-value images of each region output from the halftone processing unit 20-$k$ to form one n-value image (processing result image) and outputs the image. The values m and n are integers, and satisfy the relationship of 2≤n<m. In each exemplary embodiment of the present invention, it is described assuming n=2, in other words, an n-value image obtained as a processing result image is assumed to be a binary image.

In FIG. 1, the internal configuration of only the halftone processing unit 20-1 is illustrated. However, each of the halftone processing units 20-$k$ is configured in a similar manner. The halftone processing unit 20-$k$ includes a quantization unit 21, a correction unit 22, and a reference quantization unit 23. The halftone processing unit further includes an input port 24, an output port 25, and a reference port 26.

The quantization unit 21 and the reference quantization unit 23 perform quantization processing on pixel data of a quantization target input to the input port 24 using a predetermined quantization method. The reference quantization unit 23 quantizes the pixel data input to a first region in the divided image, and outputs the result of the quantization processing to the reference port 26. The reference quantization unit 21 also quantizes the pixel data input to a second region in the divided image including the first region, and outputs the result of the quantization processing to the output port 25.

When quantizing the pixel data in the first region, the quantization unit 21 refers to the value at the reference port 26, and the correction unit 22 controls processing parameters for the quantization processing such that the quantization result of the quantization unit 21 approaches the quantization result of the reference quantization unit 23.

In the following descriptions, the error diffusion method is used for the quantization method in the quantization unit 21 and the reference quantization unit 23. As necessary, the quantization unit 21 in the halftone processing unit 20-$k$ may be referred to as the k-th quantization unit, and the reference quantization unit 23 in the halftone processing unit 20-$k$ may be referred to as the k-th reference quantization unit.

FIG. 2 illustrates an example of the image division according to the first exemplary embodiment. In the present exemplary embodiment, the division processing unit 10 divides an input image into N pieces of rectangular regions in parallel with the main scanning direction such that a predetermined number of (in the present exemplary embodiment, 16 lines) overlap regions are included. More specifically, the input image is divided such that a part of each image after the division (divided image) overlaps with the other divided image. In the example in FIG. 2, an example of N=3 is illustrated. Hereinafter, each of the divided region is referred to as a band, and described as a band [1], a band [2], ..., and a band [N] beginning from the top.

In case of k=1, 2, ..., and N, an overlap region with a band [(k−1)] in a band [k] is referred to as a band [k]-A. An overlap region with a band [(k+1)] in the band [k] is referred to as a band [k]-C. A region not overlapping with the other bands in the band [k] is referred to as a band [k]-B. In the present exemplary embodiment, the scanning direction of the pixels is described as a raster scanning. The definition of k=1, 2, ..., and N is similarly applied in the following descriptions. In the present exemplary embodiment, each of the band [1], the band [2], ..., and the band [N] is independently processed in parallel in the halftone processing units 20-1, 20-2, ..., and 20-N respectively. Each binary data output from the halftone processing units 20-1, 20-2, ..., and 20-N is joined in the joining processing unit 30, and one sheet of binary image data is formed.

In the present exemplary embodiment, the band [k]-C in the band [k] corresponds to the first region in the divided image, and the band [k]-A, the band [k]-B, and the band [k]-C, that is, the whole of the band [k] corresponds to the second region in the divided image.

In the present exemplary embodiment, control is performed such that a result of the quantization processing in the band [k]-C in the k-th reference quantization unit 23-$k$ approaches a result of the quantization processing in the band [(k+1)]−A in the (k+1)-th quantization unit 21-($k$+1). The flow of the processing for implementing such control is described with reference to FIGS. 3A and 3B. As described above, the k-th reference quantization unit 23-$k$ is the reference quantization unit included in the halftone processing unit 20-$k$, and the (k+1)-th quantization unit 21-($k$+1) is the quantization unit included in the halftone processing unit 20-($k$+1). FIG. 3A illustrates the flow of the processing in the halftone processing unit 20-$k$. FIG. 3B illustrates the flow of the processing in the halftone processing unit 20-($k$+1).

The processing in the halftone processing unit 20-$k$ is described.

The quantization unit 21 and the reference quantization unit 23 have an error buffer for propagating an error respectively. The error buffers individually store a predetermined initial error in advance before halftone processing is performed to a corresponding band. In the present exemplary embodiment, as illustrated in FIG. 4, the same initial error is stored in the error buffer in the k-th quantization unit 21-$k$ and in the error buffer in the (k−1)-th reference quantization unit 23-($k$−1). Further, the same initial error is stored in the error buffer in the k-th reference quantization unit 23-$k$ and in the error buffer in the (k+1)-th quantization unit 21-($k$+1). With respect to the other quantization units 21 and the reference quantization units 23, an initial error is stored similarly.

For the initial error, for example, zero can be stored in all error buffers, or a value of a predetermined pattern can be stored. As long as the same initial error is stored in a pair of the error buffer in the quantization unit 21 and the corresponding error buffer in the reference quantization unit 23, the initial value can be different according to the pairs.

As illustrated in FIG. 3A, the k-th reference quantization unit 23-$k$ invalidates the value (error diffusion processing is not performed) in the processing of the band [k]-A and the band [k]-B, and performs the error diffusion processing only in the processing in the band [k]-C. At the start of the processing in the band [k]-C, the initial error is stored in the error buffer in the k-th reference quantization unit 23-$k$. The k-th quantization unit 21-$k$ sequentially performs the error diffusion processing while propagating the error to all of the band [k]-A, the band [k]-B, and the band [k]-C.

In the processing of the band [k]-A and the band [k]-B, the k-th quantization unit 21-$k$ performs normal error diffusion processing in which the quantization result in the k-th reference quantization unit 23-$k$ is not referred to, and correction is not performed. In the processing of the band [k]-C, the k-th quantization unit 21-$k$ performs the error diffusion processing using the quantization result in the k-th reference quantization unit 23-$k$ and correcting the parameters so as to approach the quantization result. The quantization result of the band [k]-A in the k-th quantization unit 21-$k$ is not output since the quantization result of the band [(k−1)]-C in the (k−1)-th quantization unit 21-($k$−1) is used as a final result as illustrated in FIG. 2.

Also, in the halftone processing unit 20-($k$+1), as illustrated in FIG. 3B, only the input differs, and the flow of the processing is similar to that in the halftone processing unit 20-$k$.

Here, processing P11 in the band [k]-C in the k-th reference quantization unit 23-$k$ and processing P13 in the band [(k+1)]-A in the (k+1)-th quantization unit 21-($k$+1) are described. The each pixel data in the band [k]-C and the band [(k+1)]-A that is input is the data of the overlapping part (overlap region), and accordingly, the data is the same.

Further, the each processing is started from a state the same initial error is set. Accordingly, the processing contents in the error diffusion processing P11 and the error diffusion processing P13 are the same. More specifically, in the processing P12 in the band [k]-C in the k-th quantization unit 21-$k$, the result in the error diffusion processing P11 in the k-th reference quantization unit 23-$k$ is referred to, however, this is equivalent to referring to the result in the error diffusion processing P13 in the (k+1)-th quantization unit 21-($k$+1).

As described above, in the error diffusion processing P12 in the band [k]-C in the k-th quantization unit 21-$k$, the processing is performed by correcting the parameters so as to approach the quantization result in the error diffusion processing P11. On the other hand, the error diffusion processing P13 in the (k+1)-th quantization unit 21-($k$+1) that is equivalent to the error diffusion processing P11 in the k-th reference quantization unit 23-$k$ is continuous with the processing P14 in the band [(k+1)]-B in the (k+1)-th quantization unit 21-($k$+1).

More specifically, the processing P12 in the band [k]-C in the k-th quantization unit 21-$k$ is performed so as to approach the quantization result in the error diffusion processing P13, and the processing P14 in the band [(k+1)]-B in the (k+1)-th quantization unit 21-($k$+1) is continuous with the error diffusion processing P13. Accordingly, the quantization result in the band [k]-C can be smoothly joined to the quantization result in the band [(k+1)]-B.

Figure 5:
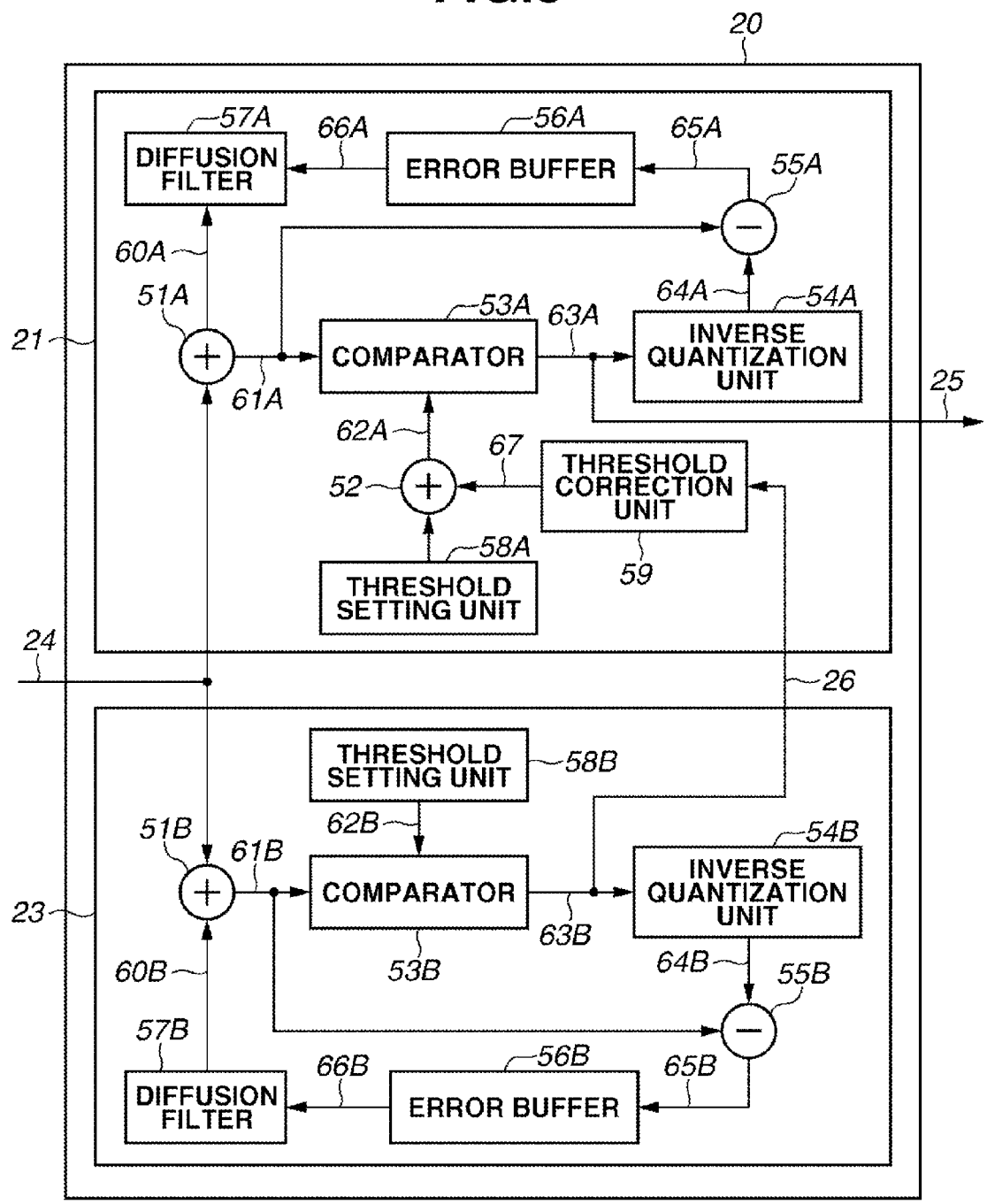
FIG. 5 illustrates an example of a configuration of a halftone processing unit according to the first exemplary embodiment.

FIG. 5 illustrates an example of a detail configuration of the halftone processing unit 20 according to the first exemplary embodiment. In FIG. 5, the same reference numerals are applied to components similar to those in FIG. 1, and overlapping descriptions are omitted. In the description below, input pixel data input from the input port 24 is 8-bit monochrome data of an integer of "zero" to "255", and output quantization values output from the output port 25 and the reference port 26 are 1-bit monochrome data of "0" or "1".

The quantization unit 21 includes adders 51A and 52, a comparator 53A, an inverse quantization unit 54A, a subtractor 55A, an error buffer 56A, a diffusion filter 57A, a threshold setting unit 58A, and a threshold correction unit 59.

The adder 51A adds input pixel data and a propagated error 60A in neighbor pixel processing, and outputs the addition result as a value to be quantized 61A. The comparator 53A compares the value to be quantized 61A with a quantization threshold 62A. The comparator 53A outputs "1" as a quantization value 63A if the value to be quantized 61A is greater than or equal to the quantization threshold 62A, and outputs "0" as the quantization value 63A if the value to be quantized 61A is smaller than the quantization threshold 62A.

The quantization value 63A is externally output via the output port 25 as the quantization result of the pixels of the quantization processing target. If the quantization value 63A is "0", the inverse quantization unit 54A outputs "0" as an inverse quantization value 64A, and if the quantization value 63A is "1", the inverse quantization unit 54A outputs "255" as the inverse quantization value 64A. The subtractor 55A subtracts the inverse quantization value 64A from the quantized value 61A, and outputs the calculation result as a quantization error 65A.

Figure 6:
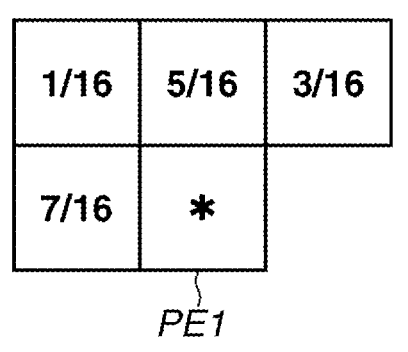

The error buffer 56A stores the quantization error 65A output from the subtractor 55A, and outputs stored quantization errors 66A to the diffusion filter 57A. The diffusion filter 57A multiplies the quantization errors 66A by diffusion coefficients used in the error diffusion processing, calculates a total sum of the values, and outputs the calculated value as the propagated error 60A. FIG. 6 illustrates an example of the diffusion coefficients used in the error diffusion processing. In FIG. 6, an element PE1 indicates a target pixel and the other elements are the diffusion coefficients of the pixels at relative positions from the target pixel PE1.

The threshold setting unit 58A sets a threshold in the quantization. In the description, it is assumed that the threshold setting unit 58A simply outputs a value "128". The threshold correction unit 59 calculates a threshold correction value 67 using a quantization value 63B supplied from the reference quantization unit 23 via the reference port 26. The method of calculating the threshold correction value is described below. The adder 52 adds the threshold correction value 67 to the output of the threshold setting unit 58A, and outputs the addition result as a quantization threshold 62A.

The reference quantization unit 23 includes an adder 51B, a comparator 53B, an inverse quantization unit 54B, a subtractor 55B, an error buffer 56B, a diffusion filter 57B, and a threshold setting unit 58B.

The adder 51B adds input pixel data and a propagated error 60B in the neighbor pixel processing, and outputs the addition result as a value to be quantized 61B. The comparator 53B compares the value to be quantized 61B with a quantization threshold 62B. The comparator 53B outputs "1" as a quantization value 63B if the value to be quantized 61B is greater than or equal to the quantization threshold 62B, and outputs "0" as the quantization value 63B if the value to be quantized 61B is smaller than the quantization threshold 62B.

If the quantization value 63B is "0", the inverse quantization unit 54B outputs "0" as an inverse quantization value 64B, and if the quantization value 63B is "1", the inverse quantization unit 54B outputs "255" as the inverse quantization value 64B. The subtractor 55B subtracts the inverse quantization value 64B from the quantized value 61B, and outputs the calculation result as a quantization error 65B.

The error buffer 56B stores the quantization error 65B output from the subtractor 55B, and outputs stored quantization errors 66B to the diffusion filter 57B. The diffusion filter 57B multiplies the quantization errors 66B by the diffusion coefficients used in the error diffusion processing, calculates a total sum of the values, and outputs the calculated value as a propagated error 60B. The threshold setting unit 58B sets a threshold in the quantization. In the description, it is assumed that the threshold setting unit 58B simply outputs a value "128", and the output of the threshold setting unit 58B is directly used as the quantization threshold 62B.

Figure 7:
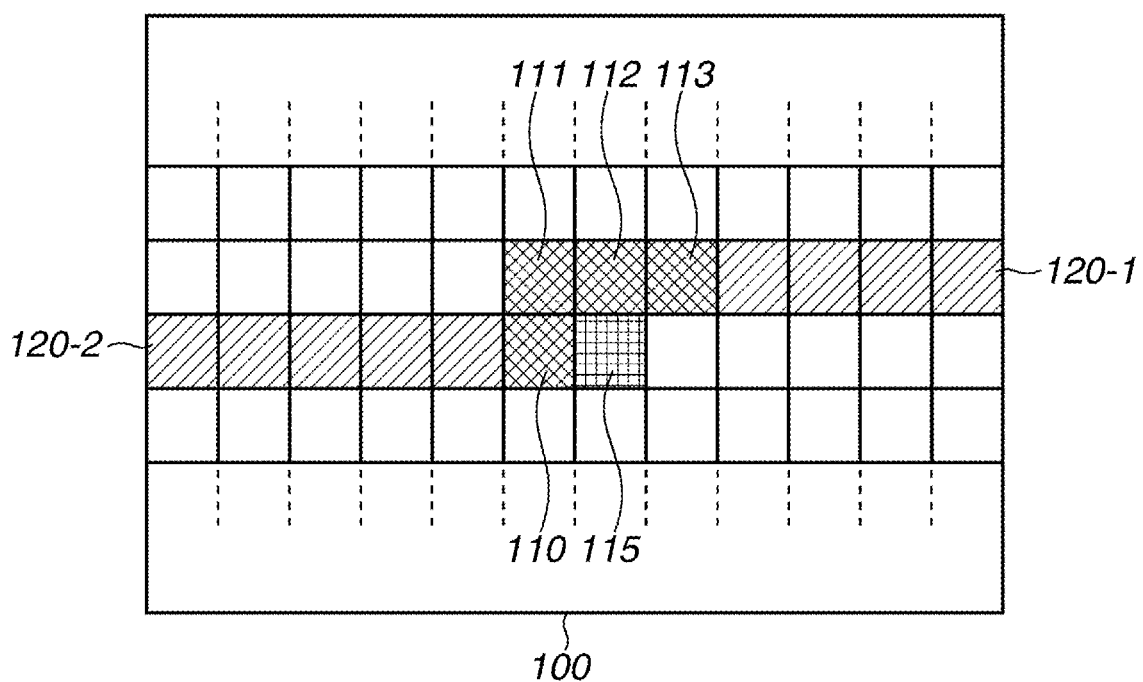
FIG. 7 illustrates an error buffer.

With reference to FIG. 7, the operation of the error buffer 56A and the diffusion filter 57A is described. FIG. 7 illustrates a band 100. It is assumed that the quantization error 65A input to the error buffer 56A is a quantization error in a pixel 110. At the time, the quantization errors of the pixels located within regions 120-1 and 120-2 are stored in the error buffer 56A.

A pixel to be processed next to the pixel 110 is a pixel 115. Then, the error buffer 56A transmits the quantization errors of the pixels 110, 111, 112, and 113 to the diffusion filter 57A. The error buffer 56A discards the quantization error of the pixel 111, and stores the quantization error of the pixel 110 therein. The diffusion filter 57A multiplies the quantization errors 66A of the pixels 110, 111, 112, and 113 by the diffusion coefficients respectively, and outputs the total sum of the values as the propagated error 60A.

For example, if the diffusion coefficients illustrated in FIG. 6 are used, in the diffusion filter 57A, the quantization errors 66A of the pixels 110, 111, 112, and 113 are multiplied by the diffusion coefficients of "7/16", "1/16", "5/16", and "3/16" respectively. The error buffer 56B and the diffusion filter 57B similarly operate.

Next, the threshold correction method in the threshold correction unit 59 is described.

In the processing of the band [k]-A and the band [k]-B, the correction is not performed, and thus, the threshold correction unit 59 outputs "0" as a threshold correction value 67. In the processing of the band [k]-C, if the quantization value 63B supplied from the reference quantization unit 23 is "1", the threshold correction unit 59 performs the correction such that the quantization value 63A of the same pixel easily takes "1", and if the quantization value 63B is "0", the threshold correction unit 59 performs the correction such that the quantization value 63A of the same pixel easily takes "0". More specifically, in the processing of the band [k]-C, the threshold correction unit 59 corrects the quantization threshold 62A to be a smaller value if the quantization value 63B is "1", and corrects the quantization threshold 62A to be a larger value if the quantization value 63B is "0".

At this time, as the processing proceeds to a lower end of the band [k]-C, that is, the boundary between the band [(k+1)]-A and the band [(k+1)]-B to be the boundary in the joined image, the intensity of the correction is increased step by step.

Figure 8:
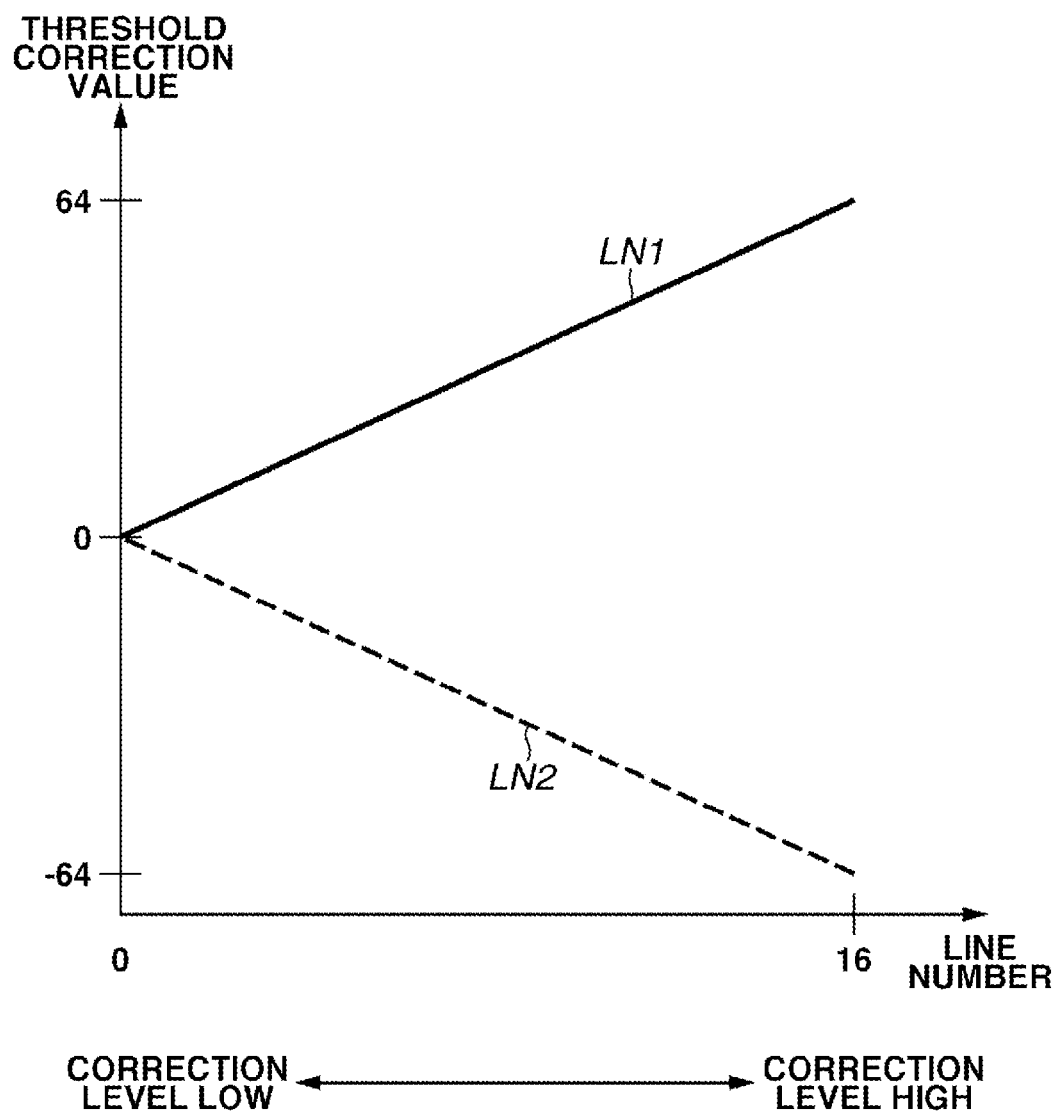
FIG. 8 illustrates an example of threshold correction according to the first exemplary embodiment.

FIG. 8 illustrates an example of the threshold correction. In FIG. 8, the horizontal axis indicates line numbers in the band [k]-C, and as the line number increases, it approaches the lower end of the band. The vertical axis indicates the threshold correction value 67. A solid line LN1 indicates correction values in a case where the quantization value 63B supplied from the reference quantization unit 23 is "0". A dashed line LN2 indicates correction values in a case where the quantization value 63B supplied from the reference quantization unit 23 is "1".

By controlling the threshold correction value as illustrated in FIG. 8, the intensity of the correction increases as it approaches the lower end of the band (the line number increases). Then, the pattern of the quantization value 63A calculated in the quantization unit 21 gradually approaches the pattern of the quantization value 63B calculated in the reference quantization unit 23.

As described above, with respect to each pixel in the overlap part (within the overlap region), the quantization value 63B calculated in the k-th reference quantization unit 23-$k$ is the same as the quantization value 63A calculated in the (k+1)-th quantization unit 21-($k$+1). More specifically, by the above-described threshold correction, the quantization result of the band [k]-C in the quantization unit 21-$k$ approaches the quantization result of the band [(k+1)]-A in the quantization unit 21-($k$+1) as it approaches the lower end of the band.

Further, since the processing in the band [(k+1)]-A is continuous with the processing in the band [(k+1)]-B (the error is correctly propagated and the error diffusion processing is performed), the pattern of the quantization result is not discontinuous between the band [(k+1)]-A and the band [(k+1)]-B. Accordingly, if the processing result of the band [k]-C and the processing result of the band [(k+1)]-B is joined, in the joined image, a binary image having a smooth joint part without streak can be obtained.

According to the first exemplary embodiment, the reference quantization unit 23 for quantizing the lower part of the band of the quantization processing target with the same processing contents as those in the upper part of the adjacent band to be joined to the band of the quantization processing target is provided. While the band of the quantization processing target is quantized by the quantization unit 21, in the case where the part overlapping with the band to be joined is quantized, the quantization result of the reference quantization unit 23 is referred to, and the quantization threshold is corrected such that the quantization result approaches thereto.

By the processing, as the processing approaches the boundary of the divided image, the dot pattern can gradually approach the dot pattern of the region to be joined across the boundary. Thus, the boundary part in the joined image (the join part of the image) becomes smooth, and the generation of a streak can be prevented. Accordingly, it is possible to prevent decrease in the image quality.

In the present exemplary embodiment, using the quantization result in the reference quantization unit 23 and the position of the pixel of the quantization processing target, the quantization threshold to be used in the quantization unit 21 is corrected. However, intermediate data in the error diffusion processing can be corrected. As long as the correction is performed such that the quantization results in the quantization unit 21 and the reference quantization unit 23 approach each other, if the correction is performed such that the intermediate data of the quantization unit 21 and the reference quantization unit 23 approaches each other, similar effects can be obtained. For example, the correction can be performed such that the propagated error 60A in the quantization unit 21 approaches the propagated error 60B in the reference quantization unit 23.

Further, in the present exemplary embodiment, the reference quantization unit 23 is provided in each halftone processing unit 20. However, the value supplied to the quantization unit 21 via the reference port 26 can be received from outside. The processing in the k-th reference quantization unit 23-$k$ is described using the example of the error diffusion processing. However, it is not limited to the above-described processing, and any quantization method can be applied as long as processing does not depend on the band [k]-A and the band [k]-B.

A second exemplary embodiment of the present invention is described. In the above-described first exemplary embodiment, the quantization threshold 62A in the quantization unit 21 is corrected using the quantization value 63B supplied from the reference quantization unit 23. In the second exemplary embodiment, input pixel data is corrected using the quantization value 63B supplied from the reference quantization unit 23. An image processing apparatus according to the second exemplary embodiment is similar to that in the first exemplary embodiment except for the internal configuration of the halftone processing unit 20, and accordingly, overlapping descriptions are omitted.

Figure 9:
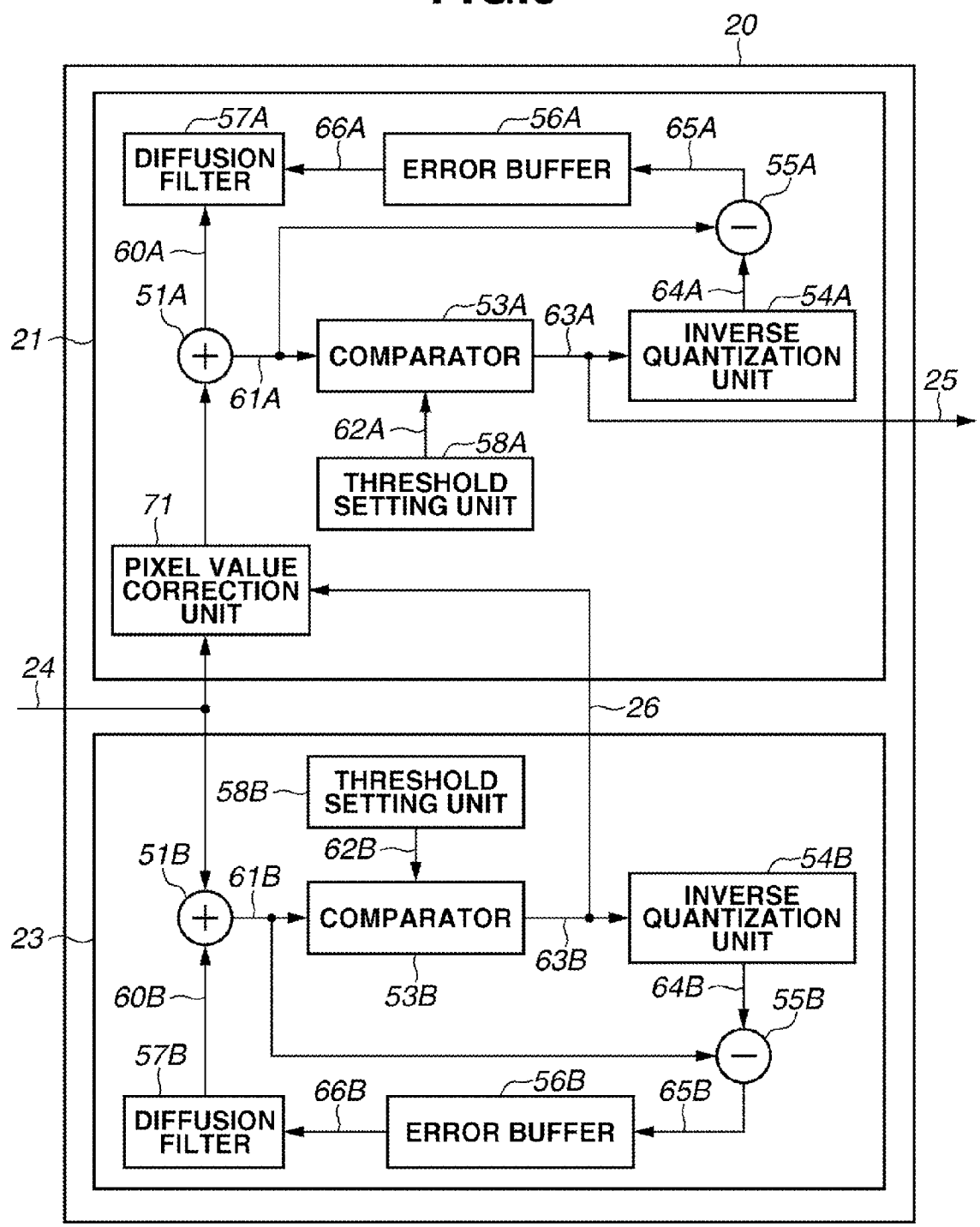
FIG. 9 illustrates an example of a configuration of a halftone processing unit according to a second exemplary embodiment.

FIG. 9 illustrates an example of a detail configuration of the halftone processing unit 20 according to the second exemplary embodiment. In FIG. 9, the components similar to those in FIG. 5 are denoted by the same reference numerals, and overlapping descriptions are omitted.

The quantization unit 21 in the halftone processing unit 20 according to the second exemplary embodiment includes the adder 51A, the comparator 53A, the inverse quantization unit 54A, the subtractor 55A, the error buffer 56A, the diffusion filter 57A, the threshold setting unit 58A, and a pixel value correction unit 71. The reference quantization unit 23 in the halftone processing unit 20 according to the second exemplary embodiment is similar to the reference quantization unit 23 in the halftone processing unit 20 according to the first exemplary embodiment.

The pixel value correction unit 71 directly outputs a value of input pixel data input from the input port 24 when processing the band [k]-A and the band [k]-B. In processing of the band [k]-C, if the quantization value 63B supplied from the reference quantization unit 23 is "1", the pixel value correction unit 71 performs the correction to the value of the input pixel data such that the quantization value 63A of the same pixel easily takes "1". In the processing of the band [k]-C, if the quantization value 63B is "0", the pixel value correction unit 71 performs the correction to the value of the input pixel data such that the quantization value 63A of the same pixel easily takes "0".

In other words, in the processing of the band [k]-C, the pixel value correction unit 71 performs the correction to increase the value of the input pixel data if the quantization value 63B is "1", and performs the correction to decrease the value of the input pixel data if the quantization value 63B is "0". At this time, as the processing approaches the lower end of the band [k]-C, the intensity of the correction is increased step by step.

According to the pixel value correction by the pixel value correction unit 71, the pattern of the quantization result in the band [k]-C approaches the quantization result in the band [k+1]-A as it approaches the lower end of the band [k], similar to the first exemplary embodiment. The adder 51A adds the output of the pixel value correction unit 71 and the propagated error 60A in the neighbor pixel processing, and outputs the addition result as the value to be quantized 61A.

According to the second exemplary embodiment, in the case where the part overlapping with the band to be joined in the band of the quantization processing target is quantized by the quantization unit 21, the quantization result of the reference quantization unit 23 is referred to, and the input pixel value is corrected such that the quantization result approaches thereto. By the processing, as the processing approaches the boundary of the divided image, the dot pattern can gradually approach the dot pattern of the region to be joined across the boundary. Thus, the boundary part in the joined image (the join part of the image) becomes smooth, and the generation of a streak can be prevented. Accordingly, it is possible to prevent decrease in the image quality.

A third exemplary embodiment of the present invention is described. In the above-described first exemplary embodiment, the output of the threshold setting units 58A and 58B is always "128". In the third exemplary embodiment, another threshold control method is applied. An image processing apparatus according to the third exemplary embodiment is similar to that in the first exemplary embodiment except for the internal configuration of the halftone processing unit 20, and accordingly, overlapping descriptions are omitted.

Figure 10:
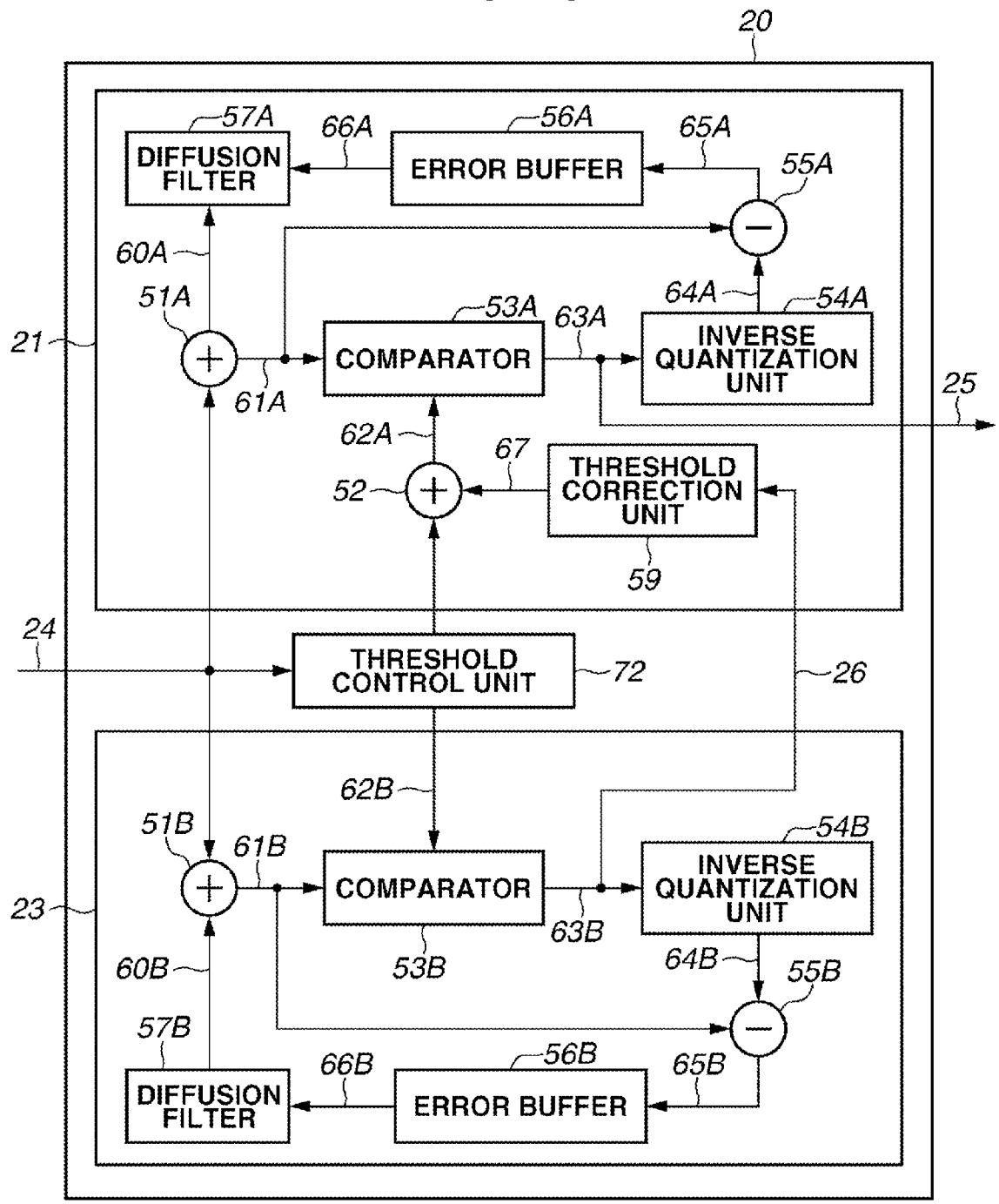
FIG. 10 illustrates an example of a configuration of a halftone processing unit according to a third exemplary embodiment.

FIG. 10 illustrates an example of a detail configuration of the halftone processing unit 20 according to the third exemplary embodiment. In FIG. 10, the same reference numerals are applied to components similar to those in FIG. 5, and overlapping descriptions are omitted.

The halftone processing unit 20 according to the third exemplary embodiment includes a threshold control unit 72 in addition to the quantization unit 21 and the reference quantization unit 23. The quantization unit 21 includes the adders 51A and 52, the comparator 53A, the inverse quantization unit 54A, the subtractor 55A, the error buffer 56A, the diffusion filter 57A, and the threshold correction unit 59. The reference quantization unit 23 includes the adder 51B, the comparator 53B, the inverse quantization unit 54B, the subtractor 55B, the error buffer 56B, and the diffusion filter 57B.

The halftone processing unit 20 according to the third exemplary embodiment illustrated in FIG. 10 performs threshold control corresponding to an input pixel value. The threshold control unit 72 is a lookup table of the entry number of 256. According to an input pixel value input from the input port 24, the threshold control unit 72 outputs a value stored in a corresponding entry. In the quantization unit 21, the adder 52 adds the output of the threshold control unit 72 and the threshold correction value 67, and outputs the addition result as the quantization threshold 62A. In the reference quantization unit 23, the output of the threshold control unit 72 is directly used as the quantization threshold 62B. By the processing, the threshold control corresponding to the input pixel value can be implemented.

In the quantization unit 21 and the reference quantization unit 23, the threshold in the quantization is controlled using the same value of the lookup table. Accordingly, with respect to each pixel in the overlap part (within the overlap region) of a plurality of bands, the quantization value 63B calculated in the k-th reference quantization unit 23-$k$ is the same as the quantization value 63A calculated in the (k+1)-th quantization unit 21-($k$+1). More specifically, effects similar to those in the first exemplary embodiment can be obtained using the quantization value 63B supplied from the reference quantization unit 23 by controlling the quantization threshold 62A in the quantization unit 21.

According to the third exemplary embodiment, the threshold control corresponding to the input pixel value can be implemented by providing the threshold control unit 72. Similarly to the first exemplary embodiment, in the case where the part overlapping with the band to be joined in the band of the quantization processing target is quantized by the quantization unit 21, the quantization result of the reference quantization unit 23 is referred to, and the input pixel value is corrected such that the quantization result approaches thereto.

By the processing, as the processing approaches the boundary of the divided image, the dot pattern can gradually approach the dot pattern of the region to be joined across the boundary. Thus, the boundary part in the joined image (the join part of the image) becomes smooth, and the generation of a streak can be prevented. Accordingly, it is possible to prevent decrease in the image quality.

In the present exemplary embodiment, the threshold control corresponding to the input pixel value is performed, however, a combination with another control method can be used. For example, threshold control corresponding to a coordinate of the input pixel (a pixel position of the quantization processing target) can be performed, or threshold control corresponding to metadata associated with the input pixel can be performed.

The fourth exemplary embodiment of the present invention is described. An image processing apparatus according to the fourth exemplary embodiment is similar to that in the first exemplary embodiment except for the halftone processing unit, and accordingly, overlapping descriptions are omitted.

Figure 11:
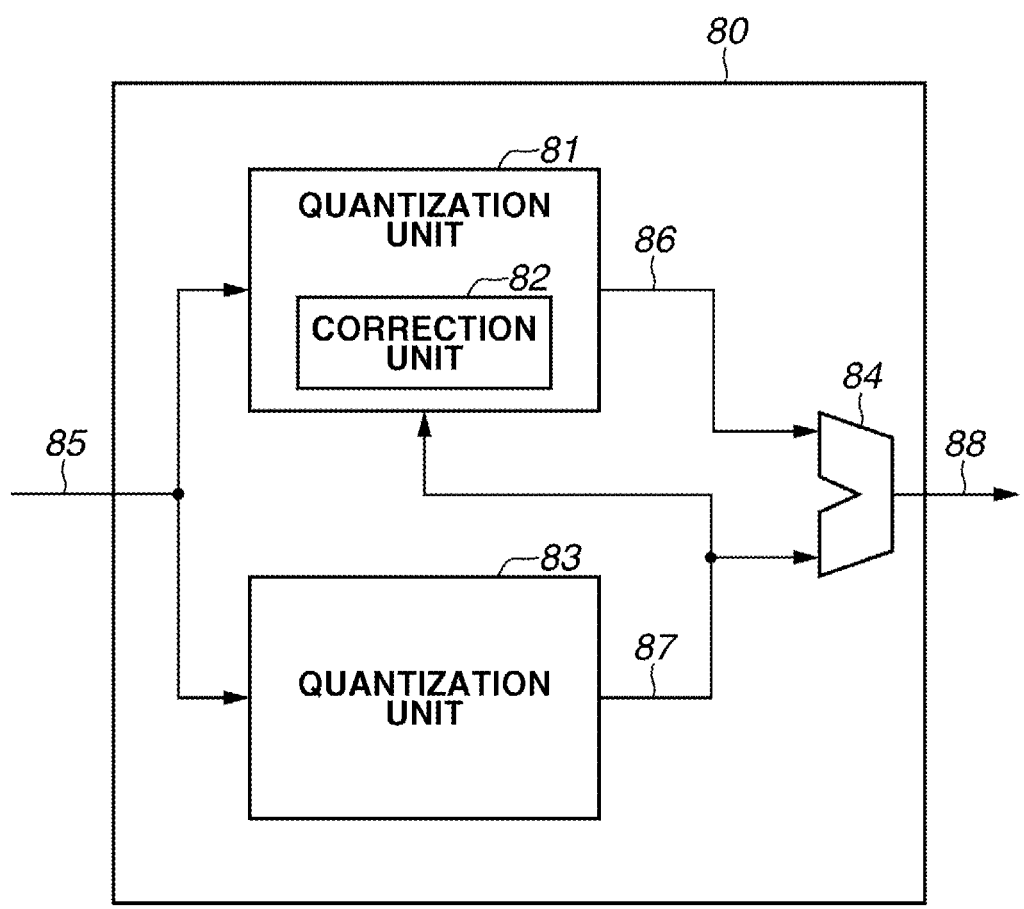
FIG. 11 illustrates an example of a configuration of a halftone processing unit according to a fourth exemplary embodiment.

FIG. 11 illustrates an example of a configuration of the halftone processing unit according to the fourth exemplary embodiment. In FIG. 11, a halftone processing unit 80 includes a first quantization unit 81, a correction unit 82, a second quantization unit 83, a multiplexer 84, an input port 85, quantization value outputs 86 and 87, and an output port 88.

The first quantization unit 81 is similar to the quantization unit 21 according to the first exemplary embodiment. The first quantization unit 81 refers to the quantization value output 87 to quantize the pixel data in the first region in the divided image, and the correction unit 82 controls parameters for the error diffusion processing so that the quantization result of the first quantization unit 81 approaches the quantization result of the second quantization unit 83. The second quantization unit 83 performs binarization processing according to a dither matrix method.

Figure 12:
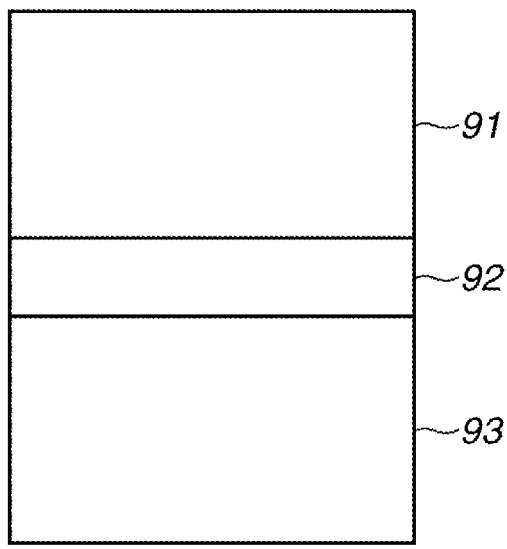
FIG. 12 illustrates an example of an input image according to the fourth exemplary embodiment.

FIG. 12 illustrates an example of the input image according to the present exemplary embodiment. The input image is classified into a region 91, a region 92, and a region 93 by attributes of the image. The region 91 is binarized by the error diffusion method, and the region 93 is binarized by the dither matrix method.

If the adjacent regions are quantized by the different quantization methods, a streak appears in the join part of the regions due to the discontinuity of the processing. To solve the issue, in the region 92, binarization processing is performed so that the pattern of the quantization result in the region 91 can be smoothly joined to the pattern of the quantization result in the region 93. More specifically, in the present exemplary embodiment, the part including the region 91 and the region 92 is quantized as a first divided image (band), and the part including the region 92 and the region 93 is quantized as a second divided image (band).

It is assumed that an input image is subjected to raster-scan and sequentially input from the outside to the input port 85. The region 91 is quantized by the first quantization unit 81. At this time, the first quantization unit 81 does not perform correction with referring to the quantization value output 87 of the second quantization unit 83. The multiplexer 84 selects the quantization value output 86 of the first quantization unit 81, and outputs the value from the output port 88 to the outside. The region 92 is quantized by the first quantization unit 81 and the second quantization unit 83.

At this time, the first quantization unit 81 refers to the quantization value output 87 of the second quantization unit 83 and performs the correction such that the quantization value output 86 of the first quantization unit 81 approaches the quantization value output 87. In the processing, the intensity of the correction is increased as it approaches the region 93. The multiplexer 84 selects the quantization value output 86 of the first quantization unit 81, and outputs the value from the output port 88 to the outside.

The region 93 is quantized by the second quantization unit 83. The multiplexer 84 selects the quantization value output 87 in the second quantization unit 83, and outputs the value from the output port 88 to the outside. Accordingly, the quantization result in the region 92 can be smoothly joined to the pattern of the quantization result in the region 91 and the pattern of the quantization result in the region 93.

According to the fourth exemplary embodiment, to the image to which the different quantization methods are applied, by referring to the quantization value generated by the one quantization unit, the processing parameters of the other quantization unit are corrected. Accordingly, when the image is quantized using the different quantization methods, the streak causing the decrease in the image quality can be removed.

In the image processing apparatus according to the above-described exemplary embodiments, the same number of the halftone processing units as those of the divided images (the number of bands) are provided, however, the number of the halftone processing units can be different. For example, the number of halftone processing units to be provided may be smaller than the number of the divided images. In such a case, according to the number of the halftone processing units, the divided images are to be divided in a plurality of groups, and the processing can be performed to each group.

According to the above features of the present invention, the first region is quantized by the first quantization unit similarly to the region to be joined, and the first region is quantized by the second quantization unit so as to become close to the quantization result. By the processing, the quantization result of the first region by the second quantization unit can become close to the quantization result of the divided image to be joined by the second quantization unit. Accordingly, the join part of the divided images can be smoothly joined. Thus, the dot pattern can be prevented from being discontinuous in the joined image, and the decrease in the image quality due to the appearance of the streak can be prevented.

The exemplary embodiments of the present invention can be implemented by executing the following processing. More specifically, software (program) to implement the functions of the above-described exemplary embodiments is supplied to a system or an apparatus via a network or various storage media. A computer (or central processing unit (CPU) or a micro processing unit (MPU)) of the system or the apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-192727 filed Aug. 30, 2010, which is hereby incorporated by reference herein in its entirety.

What is claimed is:

1. An apparatus comprising:
an image processing unit configured to quantize an m-value image divided into a plurality of divided images for each of the divided images,
wherein the image processing unit includes,
a first quantization unit configured to perform n-value conversion on a pixel value in a first region in the divided image (m and n are integers, and 2≤n<m), and
with respect to a second region in the divided image including the first region, a second quantization unit configured to perform the n-value conversion on a pixel value in a part in the second region except for the first region, and perform the n-value conversion on a pixel value in the first region using an error propagated by the n-value conversion of the part,
wherein, if the n-value conversion is performed on a pixel value in the first region, the second quantization unit corrects parameters for quantization processing using a first quantization result in the first quantization unit or intermediate data so that a second quantization result in the second quantization unit approaches the first quantization result.

2. The apparatus according to claim 1, wherein the second quantization unit changes intensity of the correction of the parameters according to a position of a pixel as a quantization processing target.

3. The apparatus according to claim 2, wherein the second quantization unit changes the intensity of the correction of the parameters such that the intensity is increased step by step from a far side to a near side with respect to a boundary of the first region to be a boundary between an adjacent divided image after joint.

4. The apparatus according to claim 1, wherein the second quantization unit corrects one of a threshold in quantization processing and a pixel value to be quantized.

5. The apparatus according to claim 1, further comprising a division processing unit configured to divide the m-value image into the plurality of divided images,
wherein each of the divided images has a region overlapping with the other divided image, and the first region is the overlapping region.

6. The apparatus according to claim 1, wherein a plurality of the image processing units are provided, and the image processing units perform quantization processing for the plurality of divided images in parallel.

7. The apparatus according to claim 1, wherein the second quantization unit performs the n-value conversion using an error diffusion method to the second region.

8. The apparatus according to claim 1, wherein the first quantization unit performs the n-value conversion using an error diffusion method to the first region with a predetermined value as an initial error.

9. The apparatus according to claim 8,
wherein each of the divided images is divided such that a part of the divided image overlaps with the other divided image, and
the initial error is same as an initial error used in performing the n-value conversion to a region corresponding to the other divided image including same pixel as the first region.

10. A method comprising:
quantizing the m-value image divided into a plurality of divided images for each of the divided images,
wherein the quantizing includes,
a first quantization step for performing n-value conversion on a pixel value in a first region in the divided image (m and n are integers, and 2≤n<m), and
with respect to a second region in the divided image including the first region, a second quantization step for performing the n-value conversion on a pixel value in a part in the second region except for the first region, and performing the n-value conversion on a pixel value in the first region using an error propagated by the n-value conversion of the part,
wherein, if the n-value conversion is performed on a pixel value in the first region, in the second quantization step, parameters for the quantization processing is corrected using a first quantization result in the first quantization step or intermediate data so that a second quantization result in the second quantization step approaches the first quantization result.

11. The method according to claim 10, wherein the second quantization step further includes changing intensity of the correction of the parameters according to a position of a pixel as a quantization processing target.

12. The method according to claim 10, wherein the second quantization step further includes correcting one of a threshold in quantization processing and a pixel value to be quantized.

13. The method according to claim 10, further comprising dividing the m-value image into the plurality of divided images,
wherein each of the divided images has a region overlapping with the other divided image, and the first region is the overlapping region.

14. The method according to claim 10, further comprising:
providing a plurality of the image processing units; and
performing quantization processing for the plurality of divided images in parallel.

15. The method according to claim 10, wherein the second quantization step further includes performing the n-value conversion using an error diffusion method to the second region.

16. The method according to claim 10, wherein the first quantization step performs the n-value conversion using an error diffusion method to the first region with a predetermined value as an initial error.

17. A non-transitory computer readable medium for causing a computer to execute image processing comprising:
causing the computer to execute an image processing for quantizing the m-value image divided into a plurality of divided images for each of the divided images,
wherein the image processing includes,
a first quantization step for performing n-value conversion on a pixel value in a first region in the divided image (m and n are integers, and 2≤n<m), and
with respect to a second region in the divided image including the first region, a second quantization step for performing the n-value conversion on a pixel value in a part in the second region except for the first region, and performing the n-value conversion on a pixel value in the first region using an error propagated by the n-value conversion of the part,
wherein, if the n-value conversion is performed on a pixel value in the first region, in the second quantization step, parameters for the quantization processing is corrected using a first quantization result in the first quantization step or intermediate data so that a second quantization result in the second quantization step approaches the first quantization result.

18. The non-transitory computer readable medium according to claim 17, wherein the second quantization step further includes changing intensity of the correction of the parameters according to a position of a pixel as a quantization processing target.

19. The non-transitory computer readable medium according to claim 17, wherein the second quantization step further includes correcting one of a threshold in quantization processing and a pixel value to be quantized.

20. The non-transitory computer readable medium according to claim 17, further comprising causing the computer to execute the image processing step for dividing the m-value image into the plurality of divided images,
   wherein each of the divided images has a region overlapping with the other divided image, and the first region is the overlapping region.

21. The non-transitory computer readable medium according to claim 17, further comprising:
   causing the computer to execute the image processing step for providing a plurality of the image processing units; and performing quantization processing for the plurality of divided images in parallel.

22. The non-transitory computer readable medium according to claim 17, wherein the second quantization step further includes performing the n-value conversion using an error diffusion method to the second region.

23. The non-transitory computer readable medium according to claim 17, wherein the first quantization step performs the n-value conversion using an error diffusion method to the first region with a predetermined value as an initial error.

* * * * *